United States Patent [19]

Smith (10) Patent No.: US 7,782,844 B1
(45) Date of Patent: Aug. 24, 2010

(54) METHOD AND APPARATUS FOR PATTERN MATCHING ON SINGLE AND MULTIPLE PATTERN STRUCTURES

(75) Inventor: David W. Smith, Cedar Park, TX (US)

(73) Assignee: GlobalFoundries, Inc., Grand Cayman (KY)

( * ) Notice: Subject to any disclaimer, the term of this patent is extended or adjusted under 35 U.S.C. 154(b) by 0 days.

(21) Appl. No.: 09/225,388

(22) Filed: Jan. 5, 1999

(51) Int. Cl.
  *H04L 12/56* (2006.01)
(52) U.S. Cl. .................. 370/389; 370/471; 370/472; 370/522; 709/220; 709/223; 709/224; 709/227; 709/232; 709/236; 712/248; 713/320; 713/323; 375/342; 375/364; 375/365; 375/368; 375/371
(58) Field of Classification Search .......... 370/389, 370/395.7, 395.72, 470, 471, 472, 475, 522; 709/220, 223, 224, 227, 232, 236; 713/320, 713/323; 712/248; 375/342, 364, 365, 368, 375/371
See application file for complete search history.

(56) References Cited

U.S. PATENT DOCUMENTS

| 4,130,874 | A | * | 12/1978 | Pai .............................. 709/245 |
| 4,425,616 | A | * | 1/1984 | Woodell ...................... 364/200 |
| 4,516,201 | A | * | 5/1985 | Warren et al. ............... 709/234 |
| 4,633,437 | A | * | 12/1986 | Mothersole et al. ........... 710/74 |
| 4,683,534 | A | * | 7/1987 | Tietjen et al. ............... 710/307 |
| 5,133,062 | A | * | 7/1992 | Joshi et al. .................. 395/500 |
| 5,487,181 | A | * | 1/1996 | Dailey et al. ............... 455/90.2 |
| 5,511,173 | A | * | 4/1996 | Yamaura et al. ............ 712/248 |
| 5,581,556 | A | * | 12/1996 | Ohie .......................... 370/431 |
| 5,696,528 | A | * | 12/1997 | Yun ............................ 345/420 |
| 5,748,688 | A | * | 5/1998 | Kim et al. ................... 375/368 |
| 5,802,305 | A | * | 9/1998 | McKaughan et al. ........ 709/227 |
| 5,822,550 | A | * | 10/1998 | Milhaupt et al. ............ 395/306 |
| 5,835,435 | A | * | 11/1998 | Bogin et al. ................ 365/227 |
| 5,905,906 | A | * | 5/1999 | Goffinet et al. ................ 710/8 |
| 5,938,771 | A | * | 8/1999 | Williams et al. ............ 713/310 |
| 6,094,443 | A | * | 7/2000 | Dwork ....................... 370/510 |
| 6,098,100 | A | * | 8/2000 | Wey et al. ................... 709/223 |
| 6,263,422 | B1 | * | 7/2001 | Wise et al. .................. 712/209 |

\* cited by examiner

*Primary Examiner*—William Trost, IV
*Assistant Examiner*—Toan D Nguyen
(74) *Attorney, Agent, or Firm*—Williams, Morgan & Amerson, P.C.

(57) ABSTRACT

The present invention provides a method and apparatus for detecting and decoding data. The method comprises: receiving a set of data signals from an external data source; detecting a size of said received set of data signals; decoding said received set of data signals; extracting a destination address from said set of data signals; comparing said destination address extracted from said data signals to a known data value; determining whether said received data signals should be received by a host circuitry based upon said comparison of said destination address extracted from said data signals to a known data value; generating at least one status signal alerting said host circuitry of said determination that said received data signals should be received by said host circuitry; and waking up said host circuitry upon a determination that said received set of data is addressed to said host circuitry. The apparatus comprises: a data formatter; a clock divider; a counter; a host circuitry interface capable of transmitting and receiving data from a host circuitry; a memory circuitry; a plurality of comparators; a mask circuitry; a digital logic circuitry; a plurality of status registers; and a plurality of clocked registers.

35 Claims, 4 Drawing Sheets

METHOD AND APPARATUS FOR PATTERN MATCHING ON SINGLE AND MULTIPLE PATTERN STRUCTURES

BACKGROUND OF THE INVENTION

1. Field of the Invention

This invention relates generally to data detection, and, more particularly, to a method and apparatus for pattern matching on single or multiple pattern structures while allowing some components of the overall circuitry to enter into a sleep mode.

2. Description of the Related Art

The proliferation of computer and communications technology has brought many innovations that improve our ability to process information, share information, and retrieve data effectively. Computers that communicate with other devices, such as other network computers, need special protocols and interfaces to effectively send and receive information. These protocols and interfaces demand that the computer be alert at all times, even when not being used, to receive and process any incoming data or to send data. This required vigilance makes the possibility of a realistic low-power mode, or sleep mode, virtually impractical using today's technology.

Computers that are properly enabled for power-saving functions may enter a sleep mode. This facilitates savings in power utilization and equipment wear, as normal operations are suspended for those features and peripherals not in use. In data communication networks, particularly in LAN-type (local area network) applications, computers or other devices could be placed into a low power or a sleep mode, when not in use. There are generally several levels of low power mode, ranging from turning off a few components, to turning off most of the components in the computer. Ideally, when not in use, a majority of the components in the resident computers should be placed into a low power mode. Many networks hold hundreds, or even thousands, of network resident computers that consume large amounts of power as an aggregate. Furthermore, many components in the network resident computer tend to experience less wear when low power mode is utilized.

However, one aspect of a computer that must always be supported, even during sleep mode, is network requests. One example is a computer residing on an Ethernet network system, which is required to monitor and respond to certain types of data packets so that the control points on the network, such as bridges and routers, are aware of their existence. For most network-type applications, certain data packet patterns must be detected, and when found, cause the computer to operate in a normal, full-power mode. Once the computer enters into its normal, full-power mode, it generally processes the captured request-data. Furthermore, the computer remains in its normal mode in order to be alert for a possible retry of the data requests.

One of the problems, caused by network resident computers being left in a low power mode is that they may not be capable of properly processing the many packets of data being sent over the network line. Even though a large number of these packets of data may not be addressed to a particular network computer, that computer must still examine the data and filter out the data that is not addressed to that particular computer. In order for the computer to effectively perform the aforementioned data filtration, a software solution is generally employed. This however, requires that most of the components in the computer, including the processor, be out of the low-power state and be alert enough to run the applicable software.

Elements that control the administration of the network constantly send and receive data. These network administrative elements, such as servers, bridges, and routers, are constantly sending out data packets, and are expecting proper responses from the network resident computers. If network computers do not respond to data packets from the network administrative elements, the network connection to the network computers may be disconnected. Furthermore, the network computer, which did not respond properly, may miss an important data packet, a global message, or an instruction. Thus, the data packet detection and evaluation program must run and monitor data in real time. Since the software must run to receive and process data packets, the processor, memory, and other major components of the computer, cannot be placed into a true low-power mode. Therefore, using software to monitor data packets on network lines is not conducive to extensive use of low-power or sleep mode for major components of network computers.

To receive data packets and process them properly, designers are forced to create networking hardware that effectively cannot enter a low-power or a sleep mode, since the hardware must be electronically alert and running to be able to process data. This causes large amounts of power consumption and considerable wear on the hardware. Even if a sleep mode or a low-power mode were to be implemented, since the hardware would have to wake up every time there was a network data package on the network line, the effect would be such that no substantial power savings could be realized. Therefore, existing network cards contain internal hardware that is designed to operate under the assumption that during normal operations, there will always be power supplied to this card and to the computer. In most network applications, a large number of network computers could be kept in a low-power or a sleep mode for around 12 to 16 hours, which could result in substantial power savings and reduced wear. During this time, it is important that these computers have some mechanism to be able to process data that was addressed to that particular computer, despite being placed into a low-power or a sleep mode.

There is a natural dilemma that occurs due to the need to have network computers able to enter low-power or sleep modes versus the need to enable these computers to be able to process network data packets. On one hand, it is desirable to have the network computer enter a sleep mode as often as possible, for as long as possible. On the other hand, the existence of the real-time network requires that the network computer be able to receive data and global signals. Furthermore, network administrators may want to service the computer during periods of time when they are not in use, which requires the computers to process network data packets.

The problem lies in the fact that with today's technology, it is very difficult to design a machine that detects data packages in a sleep mode, at the same time being able to wake up from its sleep mode based upon data received. If any portion of a computer's detection mechanism is handled by software, when the machine goes into a sleep mode the capabilities of the software terminate. Therefore, a hardware solution that does not to require a great deal of resources from the host computer is needed. Particularly, a hardware solution is needed that can properly interface with the operating system. This will reduce the need to implement sleep mode designs into non-portable custom solutions, such as custom hardware drivers or custom BIOS setup. This hardware solution should interface with the operation of the computer system such that the operating system can shut off certain portions of the computer sequentially, including the primary microprocessor, and still maintain communication and decoding capabilities for network connections. Additionally, the hardware solution should be compact such that it should not require an entire peripheral board. The hardware should be designed such that it can be merged into an existing computer peripheral board, an integrated chip, a programmable logic chip, or an ASIC.

Furthermore, a self-contained hardware circuit that is capable of receiving, processing, and decoding incoming data can make computers, and other types of workstations, work more efficiently. Since incoming data would be handled by the independent hardware circuitry, the computer or other types of workstations will be free to conduct its normal task. This would result in savings of processor, and other peripheral circuitry, utilization thereby allowing efficient usage of resources.

The present invention is directed to overcoming, or at least reducing the effects of, one or more of the problems set forth above.

SUMMARY OF THE INVENTION

The present invention provides a method for detecting and decoding data comprising: receiving a set of data signals from an external data source; detecting a size of said received set of data signals; decoding said received set of data signals; extracting a destination address from said set of data signals; comparing said destination address extracted from said data signals to a known data value; determining whether said received data signals should be received by a host circuitry based upon said comparison of said destination address extracted from said data signals to a known data value; generating at least one status signal alerting said host circuitry of said determination that said received data signals should be received by said host circuitry; and waking up said host circuitry upon a determination that said received set of data is addressed to said host circuitry.

The present invention further provides an apparatus for detecting and decoding data comprising: a data formatter; a clock divider; a counter; a host circuitry interface capable of transmitting and receiving data from a host circuitry; a memory circuitry; a plurality of comparators; a mask circuitry; a digital logic circuitry; a plurality of status registers; and a plurality of clocked registers.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
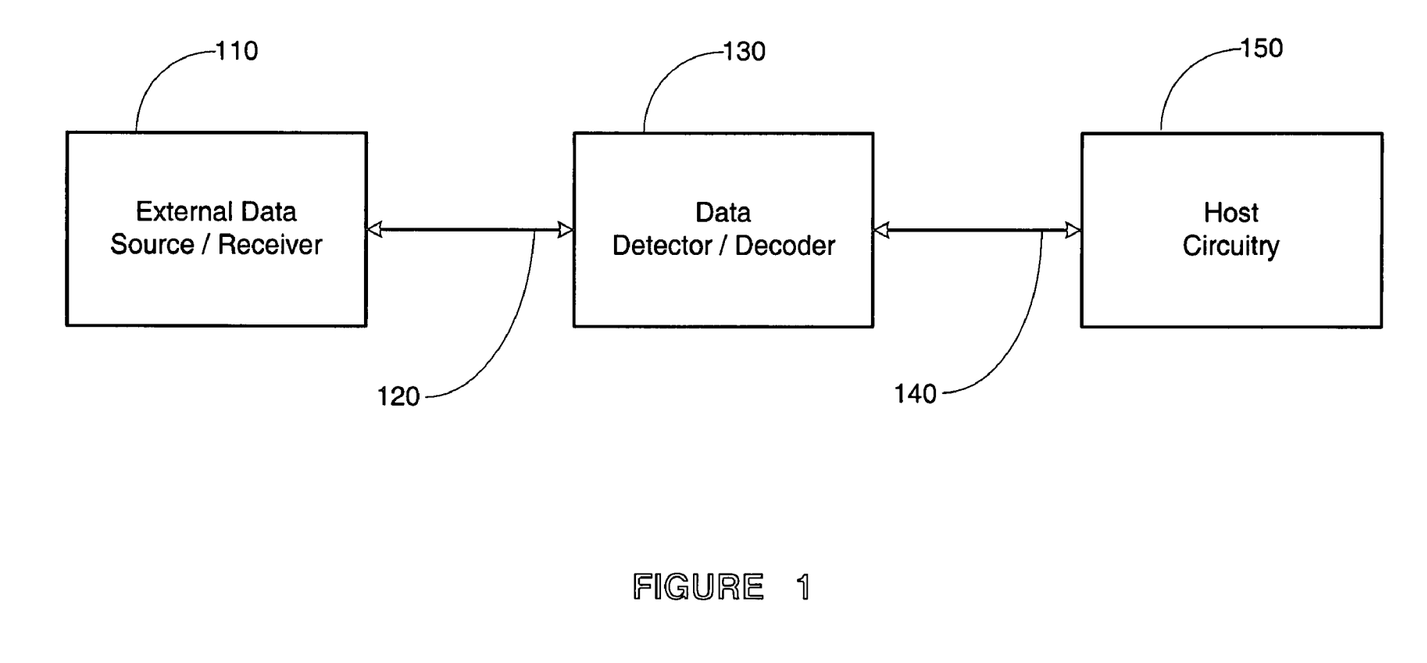
FIG. 1 illustrates a top-level block diagram of an embodiment of an apparatus for the present invention.

Turning now to FIG. 1, one embodiment of the present invention is shown. The present invention facilitates a true low-power mode for host systems, such as computers, while maintaining capabilities of receiving and processing data from outside sources, such as network lines. These capabilities can be achieved by employing hardware circuitry, rather than relying upon pure software solutions, to monitor incoming data. By utilizing the hardware solution presented in the present invention, the host circuitry can achieve an actual low-power mode, since it will not be responsible for monitoring incoming data. Furthermore, since software residing in the host will not be used to detect and decode incoming data, the host only has to enter a wake-up mode upon a signal from the hardware.

FIG. 1 illustrates one embodiment of the present invention. An external data source 110, in one embodiment, is a network server or some other data source on a computer network, wherein the computer network sends and receives network data through a network line 120. Host circuitry 150, in one embodiment, is a workstation computer that receives network data through a data detector/decoder 130 via a line 140. In one embodiment, the line 140 is an internal data bus in a computer system.

The data detector/decoder 130 contains hardware circuitry that is capable of detecting and decoding incoming data. In one embodiment, the data detector/decoder 130 is designed into circuitry that is arranged in semiconductor material and placed into an integrated circuit chip. In alternative embodiments, the data detector/decoder 130 is designed into circuitry that is contained in a programmable logic chip or an ASIC (application specific integrated circuit). In one embodiment, the integrated circuit chip, the programmable logic chip, or the ASIC, is placed on a network card that resides in the host circuitry 150. The data detector/decoder 130 cooperates with an operating system in the host circuitry 150 such that the data detector/decoder 130 allows the host circuitry 150 to enter a low-power mode, with the assurance that when the host circuitry 150 is addressed over the network line 120, a wake-up signal will be sent to the host circuitry 150. The data detector/decoder 130 concept can be applied to various embodiments related to transmission and reception of data.

In one embodiment of the invention, data from the external data source 110 is sent to the data detector/decoder 130 over a network line 120. Independent of its communication with the host circuitry 150, the data detector/decoder 130 processes the incoming data from the external data source 110. The host circuitry 150, which is a computer workstation in one embodiment, can enter into a sleep mode, where most of its processes and peripheral functions are inactive.

There are multiple levels of sleep modes that computer systems invoke. The definition of sleep mode also encompasses low-power mode and power-down mode. Some sleep modes allow for greater power savings than others. The higher the level of sleep mode that is achieved by a computer workstation, the greater the number of components that can be safely de-activated. Preferably, a sleep mode that allows the primary processors and other computer peripherals to enter a de-activated state is achieved, while still maintaining the ability to monitor and decode incoming data. This is very difficult to achieve with software solutions because the processor must be active to process the software. Furthermore, current hardware solutions generally require network cards to be fully active and in constant communication with the processor, which does not allow for a true low-power mode.

In one embodiment, the implementation of the current invention allows for a hardware solution that is capable of monitoring and processing incoming data and allows for the computer workstation and the network card to enter a true low-power mode. In this embodiment, the hardware needed to monitor and process incoming data can be placed into a single integrated circuit (IC) chip. In one embodiment, this IC chip can be located on a network card, such as an Ethernet card. Furthermore, this IC chip can cooperate with the operating system in the computer workstation such that wake-up and sleep signals can be communicated.

Figure 2:
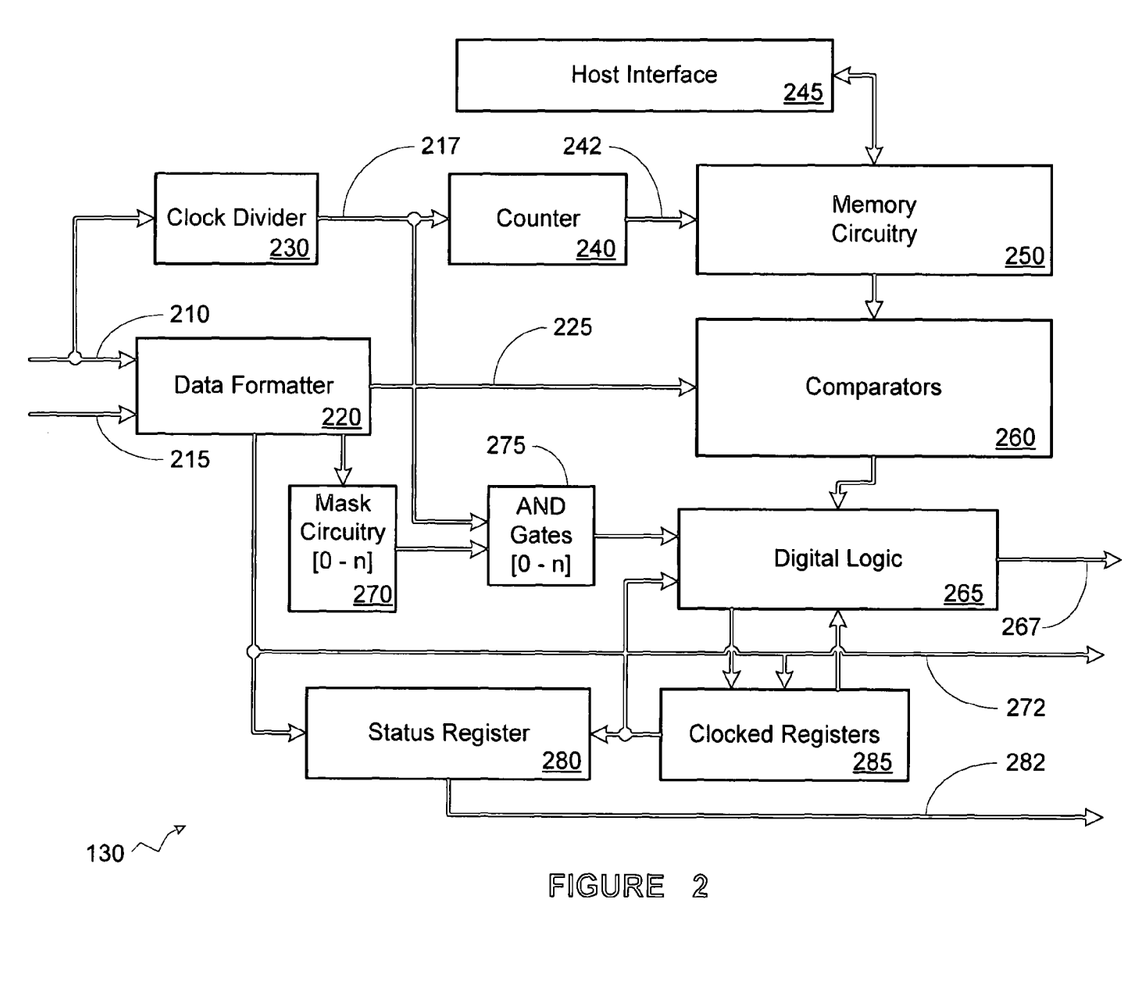
FIG. 2 depicts a block diagram of one embodiment of a Data Detector/Decoder portion of the apparatus of FIG. 1.

Turning now to FIG. 2, one embodiment of the data detector/decoder 130 is depicted in block diagram form. A data formatter 220 receives data on a line 215 and a clock signal on a line 210. The clock signal on the line 210 is also sent to a clock divider 230. The clock divider 230 uses the data clock to create a word clock, on a line 217, which is sent to a counter 240 and to a set of AND gate [0-$n$] 275, whose outputs control a digital logic circuit 265. A formatted data output, from the data formatter 220, is sent to comparators 260, via a line 225. To search for an address match, the comparators 260 compare data received with an output of a memory circuitry 250.

The rising edge of the word clock on the line 217, in one embodiment, is used to increment a counter 240. An output of the counter 240 is sent to the memory circuitry 250, where it is used to sequentially address memory locations in the memory circuitry 250. Once a comparison of the incoming formatted data, on the line 225, and data from the memory circuitry 250 takes place, output from the comparators 260 is sent to the digital logic circuit 265. Latching of the output from the comparators 260 is controlled by the output from the AND gates [0-$n$] 275. One of the inputs to the AND gates [0-$n$] 275 is the output from the clock divider 230, the word clock on the line 217. The other input to the AND gates [0-$n$] 275 is an output from a corresponding circuitry in a mask circuitry [0-$n$] 270. The mask circuitry [0-$n$] 270 is designed to prevent the latching of the output from the comparators 260 when a frame of data is not important to the address recognition of a particular computer workstation. That is, the data formatter 220 delivers the network data to the mask circuitry [0-$n$] 270, which enables the AND gates [0-$n$] 275 to pass the clock signal to the digital logic circuit 265 if the network data is identified as containing address information.

When a frame of data should be compared, and the word clock on line 217 indicates that the timing of the frame of data is correct, then the digital logic circuit 265 latches the data using clocked registers 285. An output of the clocked registers 285 is sent to the digital logic 265 for further processing. The output of the clocked registers 285 is also sent to a status register 280, where the status of the data frame matches are stored and retrieved by the host circuitry 150 via a line 282.

The digital logic circuit 265 generates an output on a line 267, the "match" signal, which indicates that a data frame match has occurred. This "match" signal on the line 267 is sent off the data detector/decoder 130, and is used to generate a wake-up signal to bring a computer workstation, or any other host circuitry 150, out of its sleep mode. The data formatter 220 also generates a "done" signal on a line 272, indicating that an end-of-packet has been detected. The "done" signal on the line 272 is sent to the clocked registers 285, where it resets the registers. The "done" signal on the line 272 is also sent to the digital logic circuit 265, where it clocks the "match" signal on the line 267, out of the data detector/decoder 130. The "done" signal on the line 272 is also sent off the data detector/decoder 130. In one embodiment, the circuit shown in FIG. 2 is capable of allowing a computer to enter a true low-power mode and still monitor, decode, and perform comparison of data, to determine if a certain data packet is intended for the computer.

Figure 3:
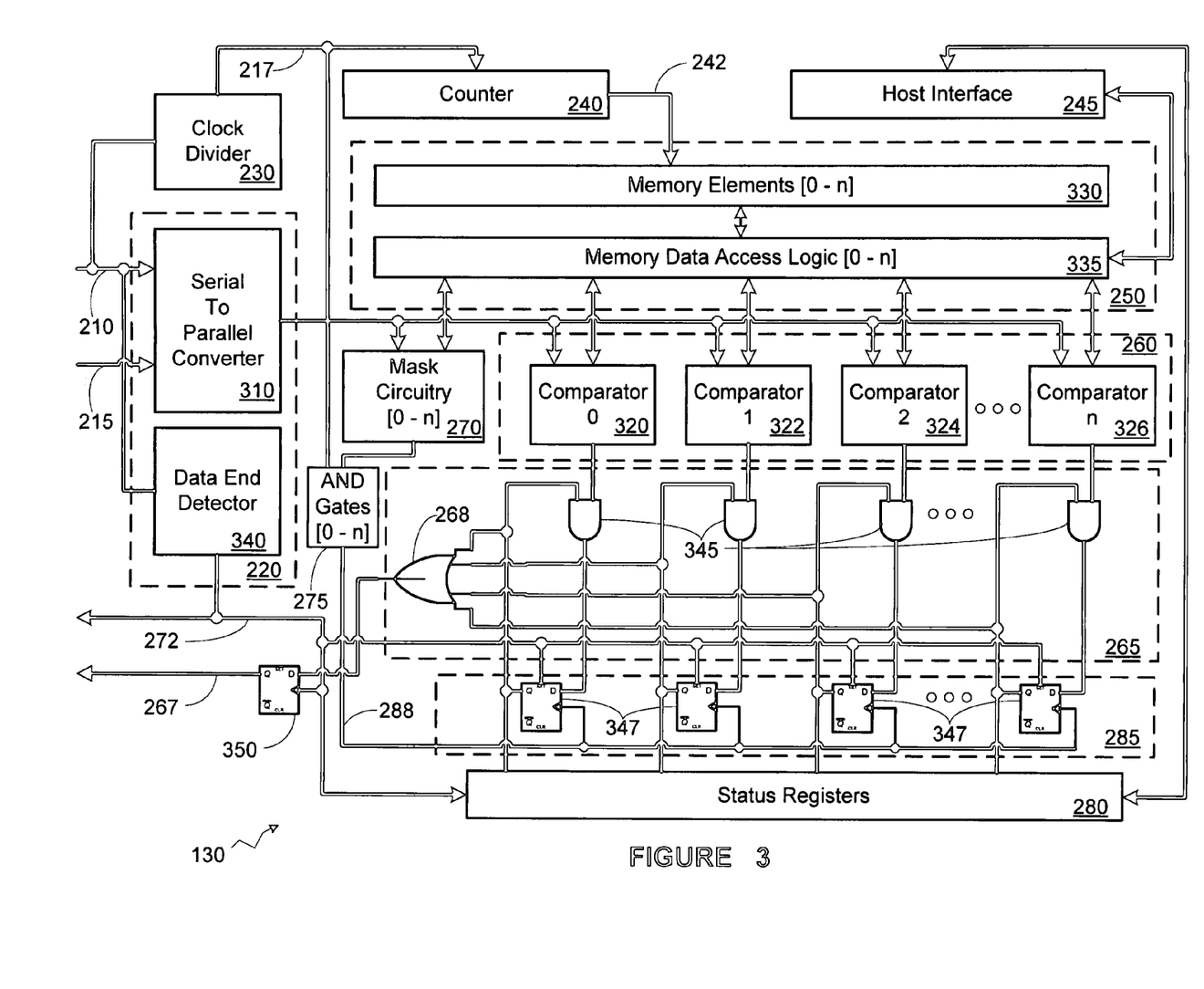
FIG. 3 depicts, in further detail, one embodiment of the Data Detector/Decoder portion of the apparatus of FIGS. 1 and 2.

Turning now to FIG. 3, one embodiment of a more detailed depiction of the inventive circuitry in the data detector/decoder 130 is illustrated. In one embodiment, serial data is sent to the data detector/decoder 130 from the external data source/receiver 110. In some embodiments, the external data source/receiver 110 is an Ethernet server, or any other type of computer network server. Generally, a data clock is either sent with the serial data or can be extracted from the serial data streams.

The data formatter 220 comprises a serial to parallel converter 310 and a data-end detector 340. The serial to parallel converter 310 receives serial packets of data and converts the serial data to parallel data packets. The data formatter 220 sends the parallel data packets to the comparators 260. The comparators 260 include a plurality of individual comparators that accommodate multiple packets, or channels, of data. For example, a comparator-0 320 will process a first data packet, a comparator-1 322 will process a second data packet, a comparator-2 324 will process a third data packet, and a comparator-n 326 will process an $n^{th}$ data packet. The use of multiple individual comparators 320-326 facilitates parallel comparison of incoming data packets.

In one embodiment, the comparators 260, being able to simultaneously handle multiple packets of data, allow real-time data processing. In an alternative embodiment, the incoming data packets can be stored into memory elements 330 for later examination by the comparators 260. The incoming data is synchronized and framed in order to be compared with known data values to see if a match has been found. The known data values, or expected data patterns, can be programmed into the memory elements [0-$n$] 330 by a driver (not shown). The individual comparators (comparator-0 320 through comparator-n 326) have the ability to access corresponding data from the memory circuitry 250. The individual comparators 320-326 respectively interface with memory data access logic [0-$n$] 335 and retrieve data stored in the memory elements 330. This is done to perform real-time comparisons with incoming synchronized packets of data frames. The clock divider 230 increments the counter 240, which, in turn, increments the addresses of the memory elements [0-$n$] 330. The incrementing of the address of the memory elements [0-$n$] 330 causes the stored data that corresponds to the received data frame to be delivered to the comparators 260, through the memory data access logic [0-$n$] 335.

Continuing referring to FIG. 3, an example illustrating one embodiment of the present invention follows. As an example, a data packet that is n (an integer) bytes or n words long, is sent to the data detector/decoder 130. The serial to parallel converter 310 in the data formatter 220 receives this data and converts the serial stream into parallel format.

The data formatter 220 also receives a serial clock signal, which is sent to the clock divider 230 and converted into a parallel word clock, on the line 217. The word clock signal on the line 217 increments the word count number in the counter 240. The word count number on the line 242 is sent to the address inputs of the memory elements [0-$n$] 330, which are located in the memory circuitry 250.

As the word count number (on the line 242) that is sent to the memory elements 330 changes, the next set of possible matching frame of data is extracted from the memory. This stored frame of data, along with the next received frame of data, is sent to an appropriate individual comparator (one of comparator-0 320 through comparator-$n$ 326). The memory data access logic [0-$n$] 335 helps to ensure that the stored data in memory that is retrieved and the incoming frames of data are synchronized with memory, and are sent to the appropriate individual comparators 320-326. The memory data access logic [0-$n$] 335 also allows the host circuitry 150 to access the memory elements [0-$n$] 330 through the host interface 245. Using the host interface 245, the host circuitry 150 can predetermine the composition of the data packets stored in memory, which should match any data packets that are addressed to that particular host. This stored data, as well as the incoming data, is then used by the comparators 260 to determine if the respective data sets match.

The comparators 260 receive both sets of data frames, the incoming data frames and the stored data frames. All n bytes or words of a data packet are framed up and sent to comparators 260. In one embodiment, the data detector/decoder 130 contains multiple individual comparators that are enabled based on the number of data frames received. For example, n individual comparators are activated to accommodate n frames of incoming data. Once the comparators 260 receive both sets of data (incoming data frames and stored data frames), they execute a comparison function, which results in a logic output from each individual comparator.

The logic outputs from the comparators 260 are sent to the digital logic circuit 265. The digital logic 265 comprises individual logic gates (AND gates 345) that receive logic-signal outputs from each individual comparator (comparator-0 320 through comparator-$n$ 326). The outputs from the individual comparators 320-326 are sent through two input AND gates 345, located in the digital logic circuit 265. The other inputs to the two input AND gates 345 are the signals that carry the previous logic states of the comparator output signals, which were clocked through Flip-Flops 347 located in the clocked registers 285. The outputs of the AND gates 345 are fed into the Flip-Flop 347, whose output was fed into one of the input ports of the AND gates 345, thereby creating a steady-state logic feedback situation.

The digital logic circuit 265, in combination with the clocked registers 285, work to create a latch that captures the output of the comparators 260, which indicates whether a match between a set of data received and stored data, has been found. If such a match is found, it may be an indication that the received data packet is intended for this particular computer workstation, or host circuitry 150. An example is given in order to illustrate one embodiment of the functionality of the feedback latch portion of the data detector/decoder 130. As an example, an n-byte stream of data is sent from the external data source/receiver 110 to the data detector/decoder 130. To address the associated host circuitry 150 properly, substantially most of the n bytes of the incoming data stream generally must be matched with the stored data for a proper data match to be true. These bytes are compared one byte at a time. The previous value of the comparator output is ANDed with the current output of the comparator, which indicates whether a particular byte has been matched. Thus, the value of the signal indicating a proper matched byte is latched.

As a further illustration of one embodiment of the present invention, a subsequent example is provided. Assume that a stream of data n bytes long is being processed, and byte number n-m (m being another integer) is being retrieved from memory for comparison. Further assume that the value of the byte number n-m properly matches the corresponding incoming byte of data. Since during the previous data cycle, the output from the Flip-Flops 347 in the clocked registers 285 were set to logic high, and the proper match of data byte number n-m results in a logic high, a logic high is latched within the feedback AND gate—Flip Flop loop. Therefore, when the results are tabulated at the end data transmission cycle, the logic circuitry that corresponds to data byte number n-m will remain at a logic high. If a proper match was not found, at any time, for byte number n-m, the comparator output will transition to a logic false level and will be latched, remaining at a logic false level.

Figure 4:
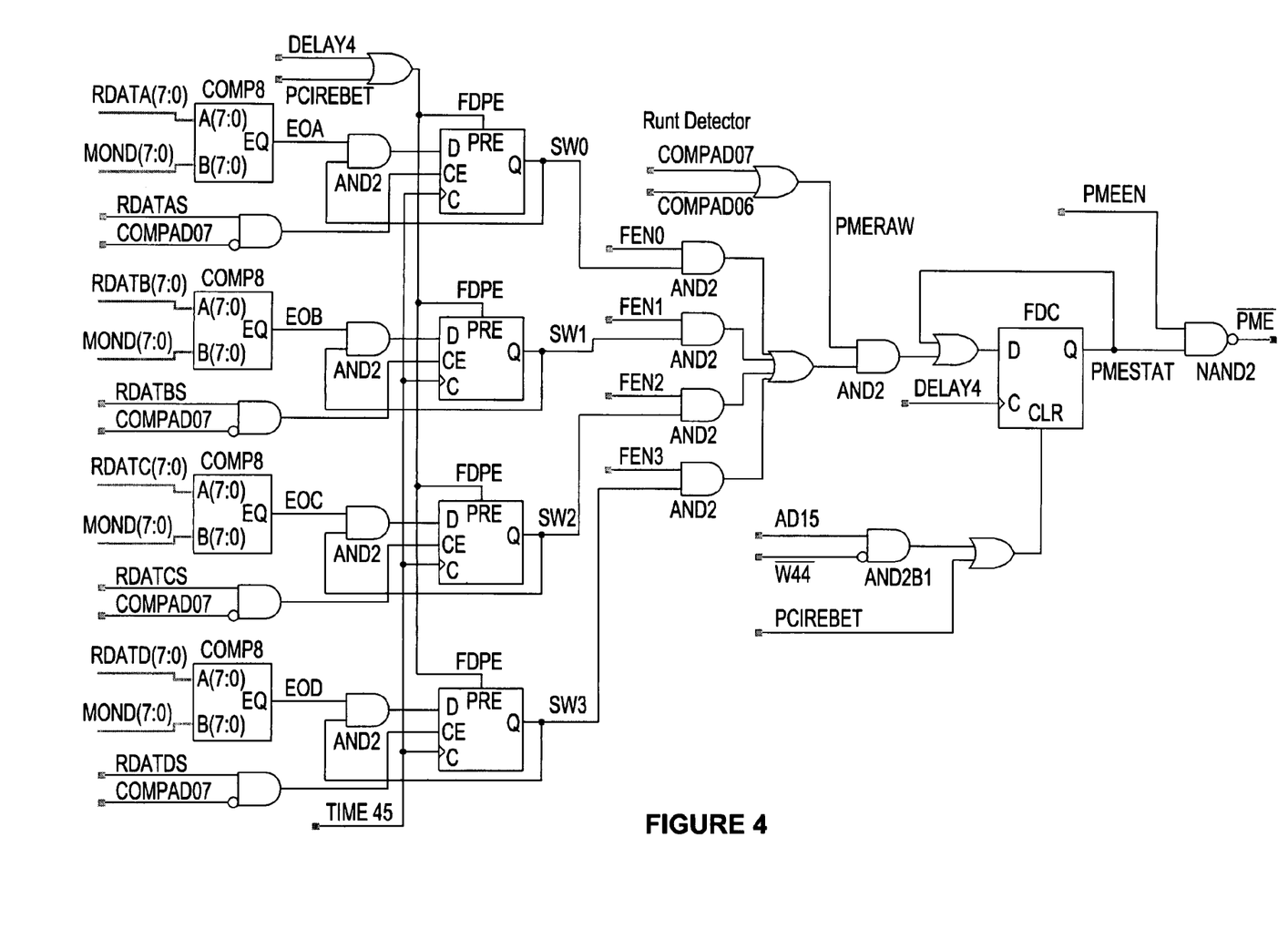
FIG. 4 depicts, in further detail, one embodiment of a comparator and latch portion of FIG. 3.

The Flip-Flops 347 in the clocked registers 285 are clocked by a positive level transition on the register clock signal, on the line 288. The register clock signal, on the line 288, is the output of the AND gate 275, whose inputs are the word clock on line 217, and the output from the mask circuitry 270. The word clock signal on the line 217 is pulsed when the end of a word occurs. This pulse determines the moment at which the present state of the comparator output, fed through one of the AND gates 345, is clocked through. The clocking of the comparator output invokes the latching mechanism described above. The output of the Flip-Flops 347 in the clocked registers 285 are sent to a variable input-size OR gate 268, located in the digital logic 265. A match signal from any one of the individual comparators 320-326 will assert the output signal from the OR gate 268, indicating a matching of incoming data, with stored data. FIG. 4 illustrates one embodiment of a design that implements comparators and latching circuitry.

Turning back to FIG. 3, the output from the mask circuitry [0-$n$] 270 can prevent the clocking of the data match signals, into the clocked registers 285. The mask circuitry [0-$n$] 270 ensures that when a certain frame of data or certain data words are not determinative of the host circuitry 150 being addressed, or otherwise unimportant, the results of those sets of data comparisons are not clocked through the clocked registers 285. In one embodiment, each individual comparator 320-326 will have a corresponding masking function circuit from the set of circuits in the mask circuitry [0-$n$] 270. The mask circuitry [0-$n$] 270 can mask the output of any one of its corresponding particular individual comparator 320-326. In one embodiment, the mask circuitry [0-$n$] 270 contains information, in memory or in some type of registers, regarding which data packets, bytes, or words are important and which one of them can be ignored. Therefore, the mask circuitry [0-$n$] 270, in response to the information described above, can facilitate the selectivity of certain data comparison results.

In an alternative embodiment, the mask circuitry [0-$n$] 270 can facilitate the selective clocking of data comparison results, by checking the status of an extra bit that is transmitted in the data packets. At times, there may be multiple frames of data sets, whose comparison results should be ignored. Furthermore, a per-byte basis of selectivity may be desired. In one embodiment, an extra bit per byte, for the length of the data frame, is transmitted. Therefore, for a frame of data containing n bytes, the data detector/decoder 130 will receive data sets that have a size of n by 9, instead of n by 8. This extra bit will indicate whether the comparison results of the associated data segment should be ignored or not. This extra bit may also be stored in the memory elements [0-*n*] 330. Therefore, for every address given to the data in memory, an extra bit is provided. Thus, instead of receiving 8-bits out, an extra bit, the mask bit, is provided and used by the mask circuitry [0-*n*] 270. This mask bit will be used by the mask circuitry [0-*n*] 270 to facilitate the selectivity of the clocking in the data comparison results into the clocked registers 285.

The data end detector 340, in the data formatter 220, uses the data clock on the line 210, to determine the end of a frame of data. The data end detector 340 asserts a data end signal, on the line 272, signifying an end of a frame of data. Upon the assertion of the data end signal on the line 272, the output from the OR gate 268, which indicates a proper data match, is clocked through a register 350. The assertion of the data end signal on the line 272 generally indicates that all portions of the received data packets that were compared, were properly matched with the stored data. The assertion of the output of the register 350, on the line 267, denotes that a proper data match has occurred at the end of a data frame. This registered data match signal, on the line 267, can be used by the computer workstation (or any other type of host circuitry 150) as a wake-up signal indicator. In other words, assertion of the data match signal, on the line 267, indicates that the computer workstation (or any other type of host circuitry 150) is being addressed and the received data packet is intended for that particular host circuitry 150.

The assertion of the data end signal on the line 272 also clears and sets the output of the Flip-Flops 347 in the clocked registers 285. This is done in preparation of the latching of the next set of outputs from the comparators 260. Furthermore, in one embodiment, upon the assertion of the data end signal, the outputs from the clocked registers 285 are sent into the status register 280. The status register 280 will then hold the value of the output, which indicates whether a data match has been found or not. The host circuitry 150 can then access the status of the processing of the received data packets by collecting data from the status register 280 through the host interface 245. One skilled in the art and has the benefit of the disclosure of the present invention would be able to devise multiple methods of implementing the present invention. One such embodiment of the present invention, as described in FIG. 3, is illustrated in FIG. 4, which can be implemented by those skilled in the art and have the benefit of the disclosure of the present invention.

It will be appreciated by those of ordinary skill in the art having the benefit of this disclosure that numerous variations from the foregoing illustration will be possible without departing from the inventive concept described herein. Accordingly, it is the claims set forth below, and not merely the foregoing illustration, which are intended to define the exclusive rights of the invention.

What is claimed:

1. A method for detecting and decoding data comprising:
    receiving a set of data signals from an external data source;
    detecting a size of said received set of data signals to use as a factor for decoding said data;
    decoding said received set of data signals;
    extracting a destination address from said set of data signals;
    comparing said destination address extracted from said data signals to a known data value;
    determining whether said received data signals should be received by a host circuitry based upon said comparison of said destination address extracted from said data signals to said known data value;
    generating at least one status signal alerting said host circuitry of said determination that said received data signals should be received by said host circuitry; and
    waking up said host circuitry from a sleep mode upon a determination that said received set of data is addressed to said host circuitry.

2. The method as described in claim 1, wherein said set of data signal received is a data packet that is in a serial data format, over a network line.

3. The method as described in claim 2, further comprising detecting said size of said received set of data signal and decoding said received set of data signals, detecting and decoding said size of said received set of data signal comprising:
    converting a serial data packet into a parallel data format;
    extracting a word clock from a received data packet;
    incrementing a number held by a counter, said word clock generating a word count;
    inputting said converted parallel format data into a plurality of comparators;
    using said word count to address data stored in a memory circuitry; and
    inputting a set of data signals from said memory circuitry into an appropriate comparator.

4. The method as described in claim 3, wherein said act of extracting said destination address from said set of data signals further comprises slicing said parallel data such that at least one destination address data word is generated.

5. The method as described in claim 3, wherein said method of comparing said destination address to a known data value further comprises:
    performing a comparison function upon said converted parallel set of data signals and said set of data from said memory circuitry;
    generating a digital comparator status signal in response of said performance of comparator function; and
    clocking in said digital comparator data signal into a register.

6. The method as described in claim 5, wherein said method of determining whether said received data signals should be received by said host circuitry further comprises latching all output of said plurality of comparators into a digital logic circuitry.

7. The method as described in claim 6, wherein said output of said comparators are not latched when a mask circuitry indicates that a particular frame of data is not compared.

8. The method as described in claim 5, wherein said method of generating a status signal alerting said host circuitry further comprises performing an OR function upon all said latched output of said comparators.

9. The method as described in claim 1, wherein said method of waking up said host circuitry further comprises generating a status signal alerting said host circuitry that a address match has been found.

10. An apparatus for detecting and decoding data, comprising:
    means for receiving a data signal;
    means for detecting a size of said received data signal;
    a data formatter;
    a clock divider;
    a counter;
    a host circuitry interface capable of transmitting and receiving data from a host circuitry, said host circuitry enter a wake up state from a sleep mode based upon decoded address data received by said host circuitry, said decoded address data being based upon a content of said data signal and said size of said received data signals;

a memory circuitry;
a plurality of comparators;
a mask circuitry;
a digital logic circuitry;
a plurality of status registers; and
a plurality of clocked registers.

11. The apparatus as described in claim 10, wherein said data formatter comprises of a serial to parallel converter and a data end detector that are capable of converting a serial stream of data into parallel data words and detecting an end of a data stream.

12. The apparatus as described in claim 10, wherein said clock divider is capable of incrementing a count held by said counter.

13. The apparatus as described in claim 10, wherein said memory circuitry comprises of a memory element and a memory data access logic.

14. The apparatus as described in claim 13, wherein said memory element is coupled with said memory data access logic such that data from said memory element can be retrieved and sent through said memory data access logic.

15. The apparatus as described in claim 14, wherein said memory data access logic is coupled with said host interface such that data can be sent to and retrieved from said memory elements.

16. The apparatus as described in claim 10, wherein said comparators are coupled with said data formatter such that said comparators receive parallel formatted data from said data formatter.

17. The apparatus as described in claim 16, wherein said comparators are further coupled with said memory circuitry such that said comparator is capable of receiving data from said memory circuitry.

18. The apparatus as described in claim 17, wherein at least one output from said comparators is further coupled to said digital logic circuitry and said clock registers such that said output of said comparators is latched by said digital logic circuitry and said clock registers.

19. The apparatus as described in claim 18, wherein said mask circuitry is capable of preventing a registering of said comparator output into said clocked registers.

20. The apparatus as described in claim 18, wherein said status registers are coupled to said digital logic circuitry and said clocked registers such that said latched comparator outputs are inputted into said status registers.

21. The apparatus as described in claim 10, wherein an output from said digital logic circuitry is clock-registered by a signal output from said data formatter.

22. The apparatus as described in claim 10, wherein said status registers are coupled with said host interface such that data from said status register could be retrieved through an access port.

23. A computer readable program storage device encoded with instructions that, when executed by a computer, performs a method, comprising:
receiving a set of data signals from an external data source;
detecting a size of said received set of data signals to use as a factor for decoding said data signals;
decoding said received set of data signals;
extracting a destination address from said set of data signals;
comparing said destination address extracted from said data signals to a known data value;
determining whether said received data signals should be received by a host circuitry based upon said comparison of said destination address extracted from said data signals to said known data value;
generating at least one status signal alerting said host circuitry of said determination that said received data signals should be received by said host circuitry; and
waking up said host circuitry from a sleep mode upon a determination that said received set of data is addressed to said host circuitry.

24. The computer readable program storage device encoded with instructions that, when executed by a computer, performs the method described in claim 23, wherein said set of data signal received is a data packet that is in a serial data format, over a network line.

25. The computer readable program storage device encoded with instructions that, when executed by a computer, performs the method described in claim 24, further comprising detecting said size of said received set of data signal and decoding said received set of data signals, detecting and decoding said size of said received set of data signal comprising:
converting said serial data packet into a parallel data format;
extracting a word clock from said received data packet;
incrementing a number held by said counter, said word clock generating a word count;
inputting said converted parallel format data into a plurality of comparators;
using said word count to address data stored in a memory circuitry; and
inputting a set of data signals from said memory circuitry into an appropriate comparator.

26. The computer readable program storage device encoded with instructions that, when executed by a computer, performs the method described in claim 25, wherein said act of extracting said destination address from said set of data signals further comprises slicing said parallel data such that at least one destination address data word is generated.

27. The computer readable program storage device encoded with instructions that, when executed by a computer, performs the method described in claim 25, wherein said method of comparing said destination address to said known data value further comprises:
performing a comparison function upon said converted, parallel set of data signals, and said set of data from said memory circuitry;
generating a digital comparator status signal in response of said performance of comparator function; and
clocking in said digital comparator data signal into a register.

28. The computer readable program storage device encoded with instructions that, when executed by a computer, performs the method described in claim 27, wherein said method of determining whether said received data signals should be received by said host circuitry further comprises latching all output of said plurality of comparators into a digital logic circuitry.

29. The computer readable program storage device encoded with instructions that, when executed by a computer, performs the method described in claim 28, wherein said output of said comparators are not latched when a mask circuitry indicates that a particular frame of data is not compared.

30. The computer readable program storage device encoded with instructions that, when executed by a computer, performs the method described in claim 28, wherein said method of generating a status signal alerting said host circuitry further comprises performing an OR function upon all said latched output of said comparators.

31. The computer readable program storage device encoded with instructions that, when executed by a computer, performs the method described in claim 23, wherein said method of waking up said host circuitry further comprises generating a status signal alerting said host circuitry that a address match has been found.

32. A method, comprising:
   receiving a data signal;
   detecting a size of said received data signal to use as a factor for extracting a destination address;
   extracting said destination address based upon said data signal to determine whether a host circuitry is being addressed by comparing said destination address to a predetermined address; and
   waking up said host circuitry from a sleep mode based upon said determination that said host circuitry is being addressed.

33. The method of claim 32, wherein extracting said destination address further comprises:
   converting a serial data packet from said received data into a parallel data format;
   extracting a word clock from said received data packet;
   incrementing a number held by a counter, said word clock generating a word count;
   inputting said converted parallel format data into a plurality of comparators;
   using said word count to address data stored in a memory circuitry;
   inputting a set of data signals from said memory circuitry into an appropriate comparator; and
   extracting said destination address by slicing said parallel data such that at least one destination address data word is generated.

34. An apparatus, comprising a controller to:
   receive a data signal;
   detect a size of said received set of data signals to use as a factor to extract a destination address;
   extract said destination address based upon said data signal to determine whether a host circuitry is being addressed by comparing said destination address to a predetermined address; and
   wake up said host circuitry from a sleep mode based upon said determination that said host circuitry is being addressed.

35. The apparatus of claim 34, further comprising:
   a data formatter capable of converting a serial stream of data into parallel data words and detecting an end of a data stream;
   a counter to receive parallel formatted data from said data formatter;
   a clock divider capable of incrementing a count held by a counter;
   a memory circuitry comprising a memory element and a memory data access logic;
   a plurality of comparators to receive parallel formatted data from said data formatter;
   a plurality of clocked registers;
   a mask circuitry capable of preventing a registering of said comparator output into said clocked registers; and
   a plurality of status registers to latch an output from said comparators.

* * * * *